US008647777B2

(12) United States Patent
Yasunaga et al.

(10) Patent No.: US 8,647,777 B2
(45) Date of Patent: Feb. 11, 2014

(54) MIXED MATERIAL OF LITHIUM IRON PHOSPHATE AND CARBON, ELECTRODE CONTAINING SAME, BATTERY COMPRISING SUCH ELECTRODE, METHOD FOR PRODUCING SUCH MIXED MATERIAL, AND METHOD FOR PRODUCING BATTERY

(75) Inventors: Yoshinobu Yasunaga, Kyoto (JP); Tokuo Inamasu, Kyoto (JP); Akihiro Fujii, Kyoto (JP); Toshiyuki Nukuda, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 902 days.

(21) Appl. No.: 12/090,228

(22) PCT Filed: Oct. 13, 2006

(86) PCT No.: PCT/JP2006/320494
§ 371 (c)(1),
(2), (4) Date: Apr. 18, 2008

(87) PCT Pub. No.: WO2007/043665
PCT Pub. Date: Apr. 19, 2007

(65) Prior Publication Data
US 2009/0236564 A1   Sep. 24, 2009

(30) Foreign Application Priority Data
Oct. 14, 2005   (JP) .............................. P.2005-299862

(51) Int. Cl.
*H01M 4/58*   (2010.01)
(52) U.S. Cl.
USPC ................ 429/231.95; 252/502; 252/518.14; 252/521.2; 252/521.5; 423/179.5; 423/306; 429/232
(58) Field of Classification Search
USPC ............. 252/500, 502, 518.14, 521.2, 521.5; 423/179, 179.5, 306; 429/231.95, 232
See application file for complete search history.

(56) References Cited

U.S. PATENT DOCUMENTS

| | | | |
|---|---|---|---|
| 7,618,747 B2 * | 11/2009 | Audemer et al. | 429/231.95 |
| 2004/0086445 A1 * | 5/2004 | Armand et al. | 423/306 |
| 2004/0157126 A1 | 8/2004 | Belharouak et al. | |
| 2005/0079118 A1 * | 4/2005 | Maruyama et al. | 423/447.3 |
| 2006/0062715 A1 * | 3/2006 | Endo et al. | 423/447.2 |
| 2006/0269466 A1 * | 11/2006 | Huang et al. | 423/445 B |

FOREIGN PATENT DOCUMENTS

| | | |
|---|---|---|
| CN | 1442917 A | 9/2003 |
| JP | 2001-015111 A | 1/2001 |
| JP | 2001-250555 A | 9/2001 |
| JP | 2002-117833 A | 4/2002 |
| JP | 2003-034534 A | 2/2003 |
| JP | 2003-292308 A | 10/2003 |
| JP | 2003-292309 A | 10/2003 |
| JP | 2004-509058 | 3/2004 |
| JP | 2004-509447 | 3/2004 |
| JP | 2004-186075 A | 7/2004 |
| JP | 2005-63955 A | 3/2005 |
| JP | 2005-123107 A | 5/2005 |
| JP | 2005-340152 A | 12/2005 |
| JP | 2006-86116 A | 3/2006 |
| JP | 2007012450 A | 1/2007 |
| WO | 02/27823 A | 4/2002 |
| WO | 02/27824 A | 4/2002 |
| WO | WO04001881 A2 * | 12/2003 |
| WO | 2007034821 A1 | 3/2007 |

OTHER PUBLICATIONS

I. Belharouak et al., "Synthesis and electrochemical analysis of vapor-deposited carbon-coated LiFePO4", Electrochemistry Communications, 2005, pp. 983-988, vol. 7, Elsevier B.V.
International Search Report for PCT/JP2006/320494 Dated Jan. 16, 2007.
Chinese Office Action dated Jun. 5, 2009 in Application No. 2006800364976.
Japanese Patent Office, Communication dated Jan. 17, 2012 issued in corresponding Japanese Application No. 2005-299862.
Japanese Patent Office, Office Action dated Aug. 7, 2012 in corresponding Japanese Application No. 2007-105956.

* cited by examiner

*Primary Examiner* — Mark Kopec
*Assistant Examiner* — Haidung Nguyen
(74) *Attorney, Agent, or Firm* — Sughrue Mion, PLLC

(57) ABSTRACT

Disclosed is a mixed material of lithium iron phosphate and carbon, which contains secondary particles as aggregates of lithium iron phosphate primary particles and a fibrous carbon which is present inside the secondary particles. An electrode containing such a mixed material, a battery comprising such an electrode, a method for producing such a mixed material, and a method for producing a battery are also disclosed.

10 Claims, 2 Drawing Sheets

MIXED MATERIAL OF LITHIUM IRON PHOSPHATE AND CARBON, ELECTRODE CONTAINING SAME, BATTERY COMPRISING SUCH ELECTRODE, METHOD FOR PRODUCING SUCH MIXED MATERIAL, AND METHOD FOR PRODUCING BATTERY

TECHNICAL FIELD

The invention relates to a mixed material of lithium iron phosphate and carbon, an electrode containing the same, battery comprising such an electrode, a method for producing lithium iron phosphate particles supporting carbon, and a method for producing a battery using lithium iron phosphate particles as an active material.

BACKGROUND ART

In recent years, nonaqueous electrolyte secondary batteries having a high energy density and excellent in cycle characteristics have drawn attention as an electric power source for mobile phones, portable appliances such as notebook computers, and electric vehicles. Among such nonaqueous electrolyte secondary battery, presently most widely commercialized ones are compact and consumer use type batteries having 2 Ah mainly mobile phones.

At present, various types of positive active materials for nonaqueous electrolyte secondary batteries are made available. Most commonly known ones are lithium-containing transition metal oxides having basic configuration of lithium cobalt oxide ($LiCoO_2$) and lithium nickel oxide ($LiNiO_2$) having an operation voltage of around 4 V, lithium manganese oxide ($LiMn_2O_4$) having spinel structure, and the like. Among these, lithium cobalt oxide has been widely employed as a positive active material since it is excellent in the charge-discharge characteristics and energy density in small capacity lithium secondary batteries with a battery capacity to 2 Ah.

However, in consideration of size enlargement to middle to large scale of batteries from now on, particularly development of batteries' applications for industrial uses, which are expected to become high demand, safety of batteries is very important issue. Accordingly, the configurations of presently available compact batteries cannot satisfy the required safety. One of reasons for that is that the thermal stability of the positive active materials of them is low.

Therefore, recently, lithium iron phosphate having an olivine structure with high thermal stability has drawn attention as a positive active material. Since this lithium iron phosphate has a covalent bond of phosphorus and oxygen, it does not release oxygen even at a high temperature. Accordingly, use of lithium iron phosphate as a positive active material can remarkably improve the safety of batteries.

However, it is known that since lithium iron phosphate has a low electron conductivity, a battery using it as an active material is inferior in the high rate discharge characteristic.

Further, as described in Japanese Patent Application Laid-Open (JP-A) No. 2001-250555 (Patent Document 1), which is a Japanese patent document, hydrated ferrous salt particles, which are a raw material, are very hard due to crystal growth and difficult to be processed such as pulverization and it is possible to obtain only coarse particles with an average particle diameter of several to several tens μm. The average particle diameter of lithium iron phosphate ($LiFePO_4$) obtained by firing a mixture of such a coarse hydrated ferrous salt and fine lithium phosphate becomes several μm or higher.

As described, in addition to the coarse size of the hydrated ferrous salt particles, since reactivity of lithium iron phosphate in chemical reaction is low, lithium iron phosphate with an uneven composition in particle level tends to be synthesized easily. Therefore, a nonaqueous electrolyte secondary battery using the lithium iron phosphate as a positive active material tends to have a low capacity.

Patent Documents 2 to 10 disclose means for forming carbon coat on the surface of lithium iron phosphate particles in order to improve the above-mentioned defective point that the lithium iron phosphate has low electron conductivity.

JP-A No. 2001-015111 (Patent Document 2), which is a Japanese patent document, discloses a technique of obtaining lithium iron phosphate ($LiFePO_4$) coated with a carbonaceous supported material. As the coating technique is disclosed that a mixture of vivianite ($Fe_3(PO_4)_2 \cdot 8H_2O$), lithium orthophosphate, and a polypropylene powder is finely pulverized by a zirconia ball mill and then heated at 350° C. to 700° C.

In this document, that carbon is supported by heterogeneous reaction of carbon monoxide is also disclosed. Further, this document discloses examples such as polyvinyl alcohols, phenol condensation products, furfuryl alcohol-derived polymers as a precursor material for a carbonaceous material.

JP-A No. 2002-117833 (Patent Document 3), which is a Japanese patent document, discloses a method of obtaining $LiFePO_4$/carbon composite. As a method, the document discloses that a mixture obtained by further adding an acetylene black powder to a mixture of $Li_3PO_4$ and $Fe_3(PO_4)_2 \cdot 8H_2O$ is milled by a planetary ball mill and fired at 600° C.

JP-A No. 2003-034534 (Patent Document 4), which is a Japanese patent document, discloses a method for producing a carbon-containing lithium iron oxide for a positive active material for lithium secondary batteries by compounding particles of lithium iron oxide ($LiFePO_4$) with olivine structure with carbonaceous fine particles. As the production method, the document discloses that a mixture obtained by mixing a lithium compound, an iron compound, a phosphorus-containing ammonium salt, and carbonaceous fine particles is fired at a temperature of 600° C. to 750° C.

JP-A No. 2003-292308 (Patent Document 5), which is a Japanese patent document, discloses a method for producing lithium iron phosphorus composite oxide carbon obtained by coating $LiFePO_4$ particle surface with a conductive carbon material. As the production method, the following technique is disclosed. A mixture is prepared by mixing ferrous phosphate hydrate ($Fe_3(PO_4)_2 \cdot 8H_2O$), lithium phosphate ($Li_3PO_4$), and the conductive carbon material. This mixture is pulverized in dry manner to obtain a reaction precursor with a specific volume of 1.5 ml/g or less. This reaction precursor is fired to coat particle surface of $LiFePO_4$ with the conductive carbon material and then the resulting product is pulverized.

JP-A No. 2004-186075 (Patent Document 6), which is a Japanese patent document, discloses a technique of coating the surface of lithium iron oxide, which is a positive active material for nonaqueous electrolyte secondary batteries with carbon fibers.

Japanese Patent Application National Publication No. 2004-509058 (Patent Document 7), which is a Japanese patent document, discloses the following two methods as a method for coating $LiFePO_4$ with carbon. One is a method of heating a mixture prepared by mixing $LiFePO_4$ with acetic acid cellulose as a carbon precursor in the presence of argon ambient current. The other is a method of heating a raw material of $LiFePO_4$ together with polyvinyl alcohol as a carbon source. Further, this document exemplifies a polymer of furfuryl alcohol as an organic substance for conductive carbon source.

Japanese Patent Application National Publication No. 2004-509447 (Patent Document 8), which is a Japanese patent document, discloses the following two methods as a method for coating LiFePO$_4$ with carbon. One is a method of heating a mixture prepared by mixing LiFePO$_4$ with acetic acid cellulose as a carbon precursor in the presence of argon atmospheric air flow. The other is a method of heating a raw material of LiFePO$_4$ in the presence of ethylene oxide-containing polyethylene-block-poly(ethylene glycol) type carbon additive while a CO/CO$_2$ mixed gas is circulated. Further, this document exemplifies a polymer of furfuryl alcohol as an organic substance for a conductive carbon source.

US Patent Application Laid-Open No. 2004/0157126 (Patent Document 9) discloses a synthesis method of a positive active material by coating cores of LiFe$_{1-x}$M$_x$PO$_4$ (M is selected from the group consisting of Mn, Co, Ti, and Ni and 0≤x≤1) with carbon by thermal decomposition of a hydrocarbon-containing gas mixture as a carbon source.

JP-A No. 2003-292309 (Patent Document 10), which is a Japanese patent document, discloses a production method of LiFePO$_4$ coated with a carbonaceous material. As the production method, the document discloses that a mixture of a raw material of LiFePO$_4$ and polyethylene glycol with an average molecular weight of 1900 to 2100 is fired in nitrogen atmosphere. Further, this document exemplifies furfuryl alcohol resin and polyvinyl alcohol as a carbonaceous material precursor, which is an organic compound to be carbonized by firing.

Patent Document 1: JP-A No. 2001-250555
Patent Document 2: JP-A No. 2001-015111
Patent Document 3: JP-A No. 2002-117833
Patent Document 4: JP-A No. 2003-034534
Patent Document 5: JP-A No. 2003-292308
Patent Document 6: JP-A No. 2004-186075
Patent Document 7: Japanese Patent Application National Publication No. 2004-509058
Patent Document 8: Japanese Patent Application National Publication No. 2004-509447
Patent Document 9: US Patent Application Laid-Open No. 2004/0157126
Patent Document 10: JP-A No. 2003-292309

DISCLOSURE OF THE INVENTION

Problems to be Solved by the Invention

The techniques disclosed in Patent Documents 2 to 10 for forming carbon coat on particle surfaces of lithium iron phosphate are effective to increase the battery capacity at the time of low rate discharge. However, batteries produced by employing these techniques are insufficient in the high rate discharge characteristic.

The invention has been accomplished to solve the above-mentioned problems and provides a mixture of lithium iron phosphate and carbon with more improved electron conductivity as compared with that by conventional techniques. Further, the invention provides a battery excellent in the high rate charge-discharge characteristic using the mixture as an active material.

Means for Solving the Problems

A first invention provides a mixed material of lithium iron phosphate and carbon, which contain secondary particles formed by aggregating lithium iron phosphate primary particles and fibrous carbon present inside of the secondary particles.

Due to having such a configuration, the electron conductivity of the lithium iron phosphate particles can be remarkably improved. Accordingly, production of a battery using the mixed material as an active material makes it possible to obtain a battery excellent in a high rate charge-discharge performance.

The description, "secondary particles formed by aggregating primary particles", in this specification does not include aggregated particles formed by binding fine particles using a binder. The description, "secondary particles formed by aggregating primary particles", in this specification means secondary particles in which the aggregate state of the primary particles is maintained even in the absence of a binder. For example, in the case active material particles made in a powder state by removing a binder contained in an electrode by dissolution in an organic solvent form large particles by aggregation of small particles, the case is included in the description, "secondary particles formed by aggregating primary particles", in this specification.

The primary particles described in this specification may made only of single particles which cannot be decomposed further finer particles or may be formed by aggregating finer particles.

The secondary particles described in this specification may be formed by direct aggregation of the primary particles or may be further aggregating particles formed by aggregating the primary particles.

A second invention according to the present invention is characterized in that fibrous carbon with a curved shape is present in the mixed material of the first invention.

A third invention according to the present invention provides an electrode containing the mixed material of the first invention as an active material.

A fourth invention according to the present invention provides a battery containing the electrode of the third invention.

A fifth invention provides a method for producing the mixed material of the first invention, characterized in that carbon produced by thermal decomposition of alcohol with a molecular weight of 100 or less is attached to lithium iron phosphate.

For example, those having double bond in a molecule just like furfuryl alcohol form polymers by polymerization. Carbonization of such an alcohols is generally carried out after polymerization. In this specification, in the case of carbon production by thermal decomposition of a polymer as described, the molecular weight of the corresponding alcohol is defined to be the molecular of the polymer. Accordingly, the description, "carbon produced by thermal decomposition of alcohol with a molecular weight of 100 or less" does not include carbon produced by thermal decomposition after an alcohol with a molecular weight of 100 or lower is polymerized and becomes a polymer with a molecular weight exceeding 100.

A sixth invention according to the present invention involves a step of heating a mixed material of an alcohol with a raw material of lithium iron phosphate or lithium iron phosphate to thermally decompose the alcohol to carbon in the production method of the fifth invention.

The alcohol in the mixed material descried in the sixth invention may be any of a gas, a liquid, and a solid. However, even if the mixed alcohol is a liquid or a solid, the alcohol is evaporated and decomposed at the temperature of thermal decomposition.

A seventh invention according to the present invention involves a step of feeding an alcohol into a container in which a raw material of lithium iron phosphate or lithium iron phosphate is set in the state that the inside of the container is kept in a temperature range of thermal decomposition of the alcohol in the production method of the fifth invention.

As a method of attaching carbon to lithium iron phosphate, there is a method of heating after the entire amount of an alcohol as a raw material of carbon is previously put in the inside of the reaction container. However, in such a case, to avoid leakage of the alcohol outside of the reaction container due to evaporation before conversion into carbon, it is necessary to carry out the reaction in a sealed container. However, if reaction is carried out in a sealed container, the pressure of the reaction container becomes very high due to evaporation of the alcohol. As a result, it becomes difficult to control facilities and reliably secure safety and therefore, there occurs a problem that the industrial realization could become difficult.

According to the seventh invention, an alcohol can be supplied bit by bit. As a result, even if a gas discharge channel is installed in a reaction container, almost all of the supplied alcohol can be converted into carbon before it is discharged. As a result, without increasing the pressure in the inside of the reaction container or without causing leakage of a large amount of the supplied alcohol, carbon can be supported on lithium iron phosphate. Consequently, the seventh invention is a production method easy to be industrially realized since it become easy to control the facilities and secure the safety.

The description, "in the state that the inside of the container is kept in a temperature range of thermal decomposition of the alcohol", in the seventh invention does not mean that the temperature in the inside of the container never becomes out of the range of the thermal decomposition of the alcohol at the time of feeding the alcohol. For example, even in the case where the temperature of the inside of the container repeatedly becomes within the temperature range of the thermal decomposition of the alcohol and out of the range, the periods during which the temperature is within the range of the thermal decomposition of the alcohol correspond to "in the state that the inside of the container is kept in a temperature range of thermal decomposition of the alcohol".

An eighth invention according to the present invention provides a step of feeding the alcohol to the inside of the container while the temperature in the inside of the container is decreased within the temperature range of the thermal decomposition of the alcohol in the production method of the sixth invention.

According to the eighth invention, the gas in the container is shrunk at the time of decreasing the temperature in the inside of the container. Naturally, the gas in insides of the secondary particles of lithium iron phosphate is also shrunk. Accordingly, the gas existing outside of the secondary particles is drawn in the insides of the secondary particles. Further, the gas present in the secondary particles before the temperature decrease is drawn further inside of the secondary particles. As a result, a more quantity of carbon can be supported in deep portions of the secondary particles. Consequently, according to the eighth invention, lithium iron phosphate particles with very high electron conductivity can be obtained and therefore, a battery using the lithium iron phosphate particles shows excellent high rate charge-discharge performance.

The description, "while the temperature in the inside of the container is decreased within the temperature range of the thermal decomposition of the alcohol", in the eighth invention does not means that the temperature is within the range of the thermal decomposition temperature of the alcohol to the final when the temperature in the inside of the container is decreased. Even in the case where the temperature becomes lower than the thermal decomposition temperature of the alcohol by decreasing the temperature, the period before the temperature becomes out of the range of the thermal decomposition temperature of the alcohol corresponds to "while the temperature in the inside of the container is decreased within the temperature range of the thermal decomposition of the alcohol" disclosed in the eighth invention.

A ninth invention is a method for producing a battery, characterized by using the lithium iron phosphate particles produced by the production method of the fifth invention as active material.

A tenth invention is a method for producing lithium iron phosphate particles supporting carbon, characterized by attaching carbon produced by thermal decomposition of methanol, ethanol, propanol or butanol to the lithium iron phosphate.

BEST MODE FOR CARRYING OUT THE INVENTION

Figure 1:
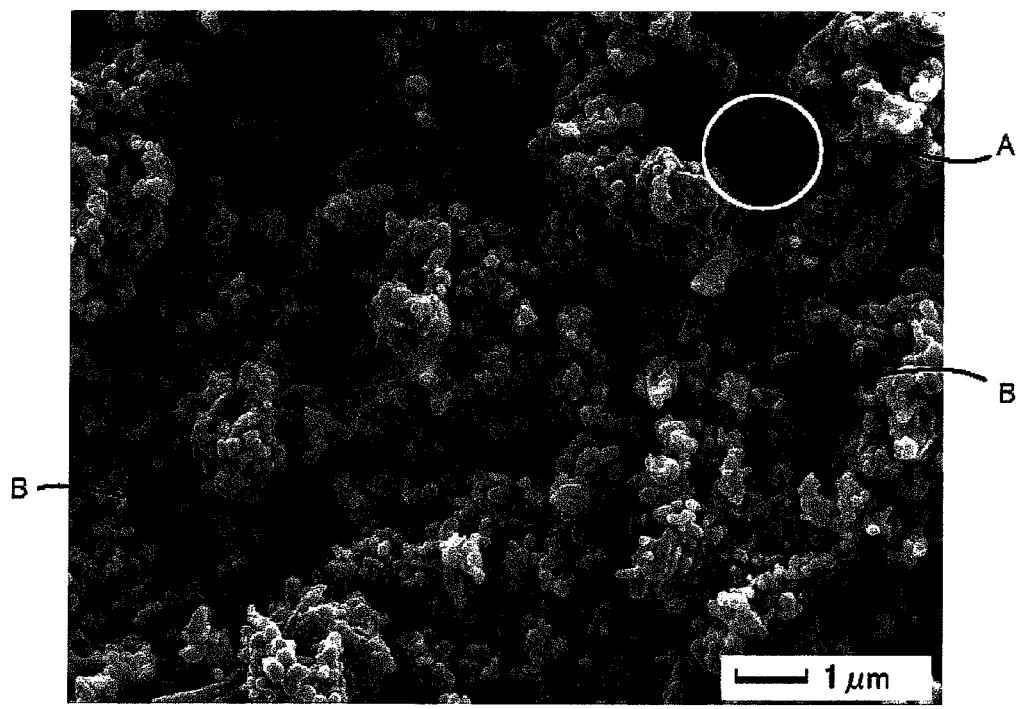
FIG. 1 is a photograph of a portion of a surface of secondary particles in a mixed material of lithium iron phosphate and carbon of Example 1 according to the present invention, photographed by an electron microscope.

One method for producing a mixed material of lithium iron phosphate and carbon according to the invention involves depositing carbon produced by thermal decomposition of an alcohol with a molecular weight of 100 or lower on particles of lithium iron phosphate. Herein, the method for producing the mixed material will be exemplified; however, the invention should not be limited to such embodiments.

In the method for producing the mixed material according to the invention, in a state that a firing furnace in which secondary particles of lithium iron phosphate formed by aggregating primary particles of lithium iron phosphate are set is maintained at a high temperature, an alcohol with a molecular weight of 100 or lower is supplied to the firing furnace.

Being heated in such a manner, the alcohol at a high temperature is evaporated or decomposed to be a gaseous substance and penetrates the inside of the secondary particles of lithium iron phosphate. Accordingly, since the gaseous substance becomes carbon in the insides of the secondary particles, it is made possible to support carbon in the insides of the secondary particles formed by aggregating the primary particles of lithium iron phosphate. Therefore, the carbon supported in the inside of lithium iron phosphate by thermal decomposition of the alcohol with a molecular weight of 100 or lower in such a manner becomes to have fibrous form.

As a method for supporting carbon, there are mainly following three methods. At first, one method is a method of feeding an alcohol after lithium iron phosphate is set in a firing furnace and the firing furnace is heated to a high temperature. Secondary, another method is a method of synthesizing lithium iron phosphate by increasing the temperature of a firing furnace to a high temperature after a raw material of lithium iron phosphate is set in the firing furnace and thereafter feeding an alcohol. Thirdly, the other method is a method of synthesizing lithium iron phosphate by increasing the temperature of a firing furnace to a high temperature after a raw material of lithium iron phosphate is set in the firing furnace and simultaneously feeding an alcohol. In the invention, any of the above-mentioned three methods may be employed.

The method of synthesizing lithium iron phosphate by increasing the temperature of a firing furnace to a high temperature after a raw material of lithium iron phosphate is set in the firing furnace and thereafter feeding an alcohol is preferable since the lithium iron phosphate synthesis and carbon deposition can be continuously carried out.

Further, as a method of feeding an alcohol to a firing furnace containing a raw material of lithium iron phosphate or lithium iron phosphate in the inside, there are a method of feeding a liquid alcohol while circulating an inert gas and a method of feeding a gaseous alcohol mixed with an inert gas to a firing furnace. Both methods are preferable since oxidation of lithium iron phosphate can be prevented.

Lithium iron phosphate on which carbon is supported is not particularly limited as long as its basic composition satisfies $LiFePO_4$ having olivine structure, and as its production method, for example, a solid phase method (JP-A No. 2000-294238), a sol-gel method (F. Croce et al. Electrochem and Solid-State Letters, 5(3)A 47-A50, 2002), a hydrothermal method (S. Franger et al. Electrochem and Solid-State Letters, 5(10)A231-A233, 2002) have been known.

Lithium iron phosphate described in this specification does not mean only those having a composition formula $LiFePO_4$ without any difference at all. To cause slight change of the basic composition of the material, e.g. to replace portion of an element of transition metal oxide (in some cases, lithium and phosphate are included) to be an active material with another element, to cause oxygen deficiency, or to slightly increase or decrease the lithium amount, is commonly caused by a person skilled in the industrial fields of batteries.

In the present invention, as typically represented by those obtained by replacing a portion of Fe or P with other elements, even compounds having a composition formula slightly sifted from $LiFePO_4$ to an extent that the basic characteristics of $LiFePO_4$ are not lost can cause similar effects. Accordingly, lithium iron phosphate described in this specification rationally includes those having a composition formula slightly sifted from $LiFePO_4$ to an extent that the basic characteristics of $LiFePO_4$ are not lost.

The temperature of the firing furnace is needed to be a temperature equal to or higher than the thermal decomposition of the alcohol. Further, the temperature is preferably 750° C. or lower at which the particle growth of lithium iron phosphate is suppressed. For example, in the case where the alcohol is methanol, since the ignition point of methanol is 385° C., it is supposed that thermal decomposition is not caused at this temperature or lower. Accordingly, in the case of using methanol, it is required to adjust the temperature of the firing furnace to be 385° C. or higher. Further, to suppress production of byproducts of lithium iron phosphate, the temperature of the firing furnace is preferable to be 500° C. or higher.

At the time of supporting carbon on lithium iron phosphate by thermal decomposition of the alcohol, it is preferable to stir lithium iron phosphate. By doing so, carbon can evenly be supported.

In the present invention, the alcohol with a molecular weight of 100 or lower to be used in the production method of the mixed material of lithium iron phosphate and carbon is preferably a liquid at 25° C. since it is easy to handle. Examples of the alcohol are methanol, ethanol, propanol and butanol. Examples of a method of feeding the alcohol to a firing furnace include a method for directly feeding a liquid and a method of feeding after a liquid is evaporated. In the case where a liquid is evaporated and fed, the gas of the alcohol and an inert gas such as nitrogen may be mixed and then fec.

In the case where the alcohol is supplied to a firing furnace, it is preferable to gasify the alcohol and feed it as a mixed gas with a gas such as nitrogen, argon, or helium. In this case, the concentration of the alcohol in the mixed gas is preferably in a range of 0.01 to 50%. If the concentration is lower than 0.01%, it takes a long time to deposit carbon on the particle surface of lithium iron phosphate and it is industrially disadvantageous. On the other hand, if the concentration exceeds 50%, the alcohol remains while being un-decomposed and may sometimes be discharged out of the firing furnace. As a result, carbonization ratio of the alcohol becomes low and it is industrially disadvantageous.

In the case where fibrous carbon obtained by thermal decomposition of the alcohol is supported in the insides of the secondary particles of lithium iron phosphate, since the electron conductivity of carbon is very high and the fibrous shape is excellent in electron conduction network formation among primary particles, the electron conductivity among the primary particles in the insides of the secondary particles become very high. As a result, a battery using the mixed material of lithium iron phosphate and carbon is provided with an excellent high rate charge-discharge performance.

Next, an embodiment of a battery according to the present invention will be described. The battery of the invention is configured with a positive electrode containing the mixed material produced by the above-mentioned production method as a positive electrode material, a negative electrode containing a negative electrode material, and an electrolyte containing an electrolytic salt in a solvent. Generally, the positive electrode and the negative electrode are laminated or rolled while sandwiching a separator therebetween to produce an electrode unit. This electrode unit is wrapped with an outer body.

The mixed material according to the invention is particularly preferable to be used for a nonaqueous electrolyte secondary battery. An embodiment of a nonaqueous electrolyte battery is the same as that of the above-mentioned battery that is not limited to the nonaqueous electrolyte battery. However, in the case of the nonaqueous electrolyte secondary battery, a nonaqueous solvent is used as a solvent for an electrolyte.

The nonaqueous electrolyte to be used for the nonaqueous electrolyte secondary battery in the invention may be those which are generally proposed to use for nonaqueous electrolyte secondary batteries. The nonaqueous solvent may be solely the following solvents or mixture of these solvents, for example, cyclic carbonic acid esters such as propylene carbonate, ethylene carbonate, butylene carbonate, and chloroethylene carbonate; cyclic esters such as γ-butyrolactone and γ-valerolactone; chain carbonates such as dimethyl carbonate, diethyl carbonate, and ethyl methyl carbonate; chain esters such as methyl formate, methyl acetate, and methyl butyrate; tetrahydrofuran and its derivatives; ethers such as 1,3-dioxane, 1,4-dioxane, 1,2-dimethoxyethane, 1,4-dibutoxyethane, and methyl diglyme; nitriles such as acetonitrile and benzonitrile; dioxolane and its derivatives; ethylene sulfide, sulfolane, sultone and their derivatives. However, the nonaqueous solvent is not limited to these examples.

Examples of the electrolytic salt include ionic compounds such as $LiClO_4$, $LiBF_4$, $LiAsF_6$, $LiPF_6$, $LiCF_3SO_3$, $LiN(SO_2CF_3)_2$, $LiN(SO_2C_2F_5)_2$, $LiN(SO_2CF_3)(SO_2C_4F_9)$, LiSCN, LiBr, LiI, $Li_2SO_4$, $Li_2B_{10}Cl_{10}$, $NaClO_4$, NaI, NaSCN, NaBr, $KClO_4$, and KSCN.

These ionic compounds may be used alone or two or more of these may be mixed and used. Among these ionic compounds, $LiN(SO_2C_2F_5)_2$ is excellent in high temperature stability and suitable for suppressing corrosion of an aluminum current collector and terminals at the time of charging and is therefore preferable.

A concentration of the electrolytic salt in the nonaqueous electrolyte is preferably 0.5 mol/l to 5 mol/l, and more preferably 1 mol/l to 2.5 mold to reliably obtain a nonaqueous electrolyte battery having excellent battery characteristics.

A mixed material of lithium iron phosphate and carbon of the invention is preferable to be used as a positive active material of a nonaqueous electrolyte secondary battery. An nonaqueous electrolyte secondary battery excellent in the energy density of battery and charge-discharge cycle performance can be obtained by combination with a negative electrode described below.

Examples of a negative electrode material may include, in addition to lithium metals, lithium alloys (lithium meal-containing alloys such as lithium-aluminum, lithium-lead, lithium-tin, lithium-aluminum-tin, lithium-gallium, and wood's metal), alloys capable of absorbing and desorbing lithium, carbon materials (e.g., graphite, hard carbon, low temperature fired carbon, amorphous carbon, and the like), metal oxides, lithium metal oxides ($Li_4Ti_5O_2$), and polyphosphoric acid compounds.

Among them, graphite is particularly preferable as a negative electrode material since it has an operation voltage very close to that of metal lithium and capable of carrying out charge and discharge at a high operation voltage. For example, artificial graphite and natural graphite are preferable.

Particularly, graphite obtained by modifying negative active material particle surfaces with amorphous carbon is preferable since such graphite is accompanied with little gas emission during charging. Further, in the case of using a lithium salt as an electrolytic salt, $Li_4Ti_5O_{12}$ can suppress self discharge and irreversible capacity in charge and discharge can be decreased as much as possible.

A powder of the positive active material and a powder of the negative active material are preferable to have an average particle size of 100 μm or smaller. Particularly, the powder of the positive active material is desirable to have 50 μm or smaller size from the viewpoint of electron conductivity. To obtain a powder with a prescribed shape, a milling apparatus and a classifying apparatus are employed.

For example, a mortar, a ball mill, a sand mill, a vibration ball mill, a planetary ball mill, a jet mill, a counter jet mill, a swirling current type jet mill, a sieve, and the like may be employed. At the time of pulverization, wet type pulverization in presence of water or organic solvent such as ethanol can be employed. A classifying method is not particularly limited and a sieve and an air blow classifying apparatus may be used based on the necessity in both dry and wet types.

In the present invention, the method for producing lithium iron phosphate supporting carbon preferably involves classification to control the maximum particle diameter of lithium iron phosphate to be 1 μm or larger and 3 mm or smaller and then deposition of carbon in the powder of lithium iron phosphate.

At the time of feeding the alcohol to a firing furnace, to suppress scattering of lithium iron phosphate from the firing furnace, the maximum particle diameter of lithium iron phosphate is preferable to be 1 μm or larger. Further, in order to support carbon produced by thermal decomposition of the alcohol sufficient deep in the insides of the secondary particles of lithium iron phosphate, the maximum particle diameter of lithium iron phosphate is preferable to be 3 mm or smaller.

It is found that a positive electrode material for a nonaqueous electrolyte secondary battery containing lithium iron phosphate classified to have the maximum particle diameter of lithium iron phosphate of 1 μm or large and 3 mm or smaller and supporting carbon produced by thermal decomposition of the alcohol is provided with remarkably heightened conductivity. As a result, a nonaqueous electrolyte secondary battery comprising the positive electrode material is excellent in the high rate charge-discharge performance.

The positive active material and negative electrode material, which are main constituting components of a positive electrode and a negative electrode, are described in detail and the positive electrode and negative electrode may contain a conductive agent, a binder, a thickener, a filler, and the like as other constituting components besides the main constituent components.

As the conductive agent, any can be employed as long as it is an electron conductive material which does not cause any adverse effect on battery performance. Generally usable examples are one or a mixture of conductive materials such as natural graphite (scaly graphite, flaky graphite, and soil-like graphite), artificial graphite, carbon black, acetylene black, Ketjen black, carbon whisker, carbon fibers, metal (copper, nickel, aluminum, silver, gold, and the like) powder, metal fibers, and conductive ceramic materials can be contained in an electrode material. Among these, as the conductive agent, acetylene black is desirable from the viewpoint of the electron conductivity and coatability.

The amount to be added of the conductive agent is preferably 0.1% by mass to 50% by mass, and particularly preferably 0.5% by mass to 30% by mass based on the total mass of the positive electrode and the negative electrode. Especially, if acetylene black is used while pulverized to ultrafine particles of 0.1 to 0.5 μm, the necessary amount of carbon can be saved and therefore, it is desirable.

A mixing method of these is physical mixing, and an ideal mixing is homogeneously mixing. For that, a powder mixing apparatus such as a V-shape mixing apparatus, an S-shape mixing apparatus, a stone mill, a ball mill, and a planetary ball mill may be used in dry or wet type.

Examples of the above-mentioned binder may be generally one or mixtures of thermoplastic resins such as polytetrafluoroethylene (PTFE), poly(vinylidene fluoride) (PVDF), polyethylene, polypropylene, and the like; and polymers having rubber elasticity such as ethylene-propylene-diene terpolymer (EPDM), sulfonated EPDM, styrene-butadiene rubber (SBR), fluoro rubber and the like. The amount to be added of the binder is preferably 1% by mass to 50% by mass and particularly preferably 2% by mass to 30% by mass based on the total mass of the positive electrode and the negative electrode.

Examples of the above-mentioned thickener may be generally one or mixtures of polysaccharides such as carboxymethyl cellulose and methyl cellulose. Further, it is desirable for a thickener having a functional group reactive with lithium just like polysaccharides to deactivate the functional group by methylation or the like. The amount to be added of the thickener is preferably 0.5% by mass to 10% by mass, and particularly preferably 1% by mass to 2% by mass based on the total mass of the positive electrode and the negative electrode.

As the filler, any material can be employed as long as it is a material which does not cause any adverse effect on battery performance. Generally usable examples are olefin type polymers such as polypropylene and polyethylene, amorphous silica, alumina, zeolite, glass and carbon. The amount to be added of the filler is preferably 30% by mass or less based on the total mass of the positive electrode and the negative electrode.

The positive electrode and the negative electrode are preferably produced by mixing the above-mentioned active materials, conductive agent, and binder in an organic solvent such as N-methylpyrrolidone, toluene, or the like or water, and applying the obtained solutions to current collectors described in detail below and drying the solutions.

An application method is desirable to be carried out in an arbitrary thickness and arbitrary shape using means, for example, roller coating such as an applicator rolls, screen coating, doctor blade manner, spin coating, and bar coater. However, the method should not be limited to these examples.

As the current collector, any can be employed as long as it is an electron conductor which does not cause any adverse effect on the assembled battery and the following materials may be used. These materials can be treated by oxidation on the surface thereof.

Examples of the current collector for the positive electrode such as aluminum, titanium, stainless steel, nickel, fired carbon, conductive polymers, and conductive glass can be used. Additionally, in order to improve the adhesiveness, conductivity, and oxidation resistance, those obtained by treating surface of aluminum, copper, or the like with carbon, nickel, titanium, silver, or the like can be used.

Examples of the current collector for the positive electrode such as copper, nickel, iron, stainless steel, titanium, aluminum, fired carbon, conductive polymers, conductive glass, and Al—Cd alloys can be used. Additionally, in order to improve the adhesiveness, conductivity, and reduction resistance, those obtained by treating surface of copper or the like with carbon, nickel, titanium, silver, or the like can be used.

A form of the current collectors to be employed may be foil type and also a film-like, sheet-like, net-like, punched, or expanded form and a lath body, a porous body, a foamed body, and a formed body of fiber groups. The thickness is not particularly limited, however those with 1 to 500 μm are used.

Among these current collectors, an aluminum foil excellent in oxidation resistance is preferable to be used for the positive electrode and a copper foil, a nickel foil, an iron foil, and an alloy foil partially containing them which are excellent in reduction resistance and conductivity and economical are preferable to be used for the negative electrode.

Further, the positive electrode and negative electrode current collectors are preferable to be foils with a coarse surface roughness of 0.2 μm Ra or more. Use of such foils makes the adhesiveness of the positive electrode material and negative electrode material with the current collectors excellent. Accordingly, it is preferable to use electrolyzed foils which they have such coarse surfaces. Particularly, electrolyzed foils subjected to nosing treatment are most preferable. In the case where both side coating is carried out for the foils, it is desirable the surface roughness of the foils is same or almost same.

As a separator for nonaqueous electrolyte batteries, pours films or nonwoven fabrics showing excellent high rate charge-discharge performance may be preferably used alone or a plurality of these may be preferably used in combination. Examples of the material composing the separator for nonaqueous electrolyte batteries include polyolefin based resins represented by polyethylene and polypropylene; polyester based resins represented by polyethylene terephthalate and polybutylene terephthalate; poly(vinylidene fluoride), vinylidene fluoride-hexafluoropropylene copolymers, vinylidene fluoride-perfluorovinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers, and vinylidene fluoride-ethylene-tetrafluoroethylene copolymers.

The porosity of the separator for nonaqueous electrolyte batteries is preferably 98% by volume or less in terms of the strength. Further, porosity is preferably 20% by volume or more in terms of the charge-discharge characteristics. Further, the separator for nonaqueous electrolyte batteries may use polymer gel made of a polymer such as acrylonitrile, ethylene oxide, propylene oxide, methyl methacrylate, vinyl acetate, vinylpyrrolidone, poly(vinylidene fluoride) and an electrolyte.

With respect to the separator for nonaqueous electrolyte batteries, if the above-mentioned porous films and nonwoven fabrics are used in combination with the polymer gel, a solution retention property of the electrolyte is improved and therefore it is preferable. That is, in addition to formation of a film by coating the surface and fine pore wall surfaces of a finely porous polyethylene film with a solvent-philic polymer having a thickness of several μm or less, the electrolyte is retained in the fine pores of the film. The above-mentioned solvent-philic polymer is gelled by doing so.

Examples of the above-mentioned solvent-philic polymer include, in addition to poly(vinylidene fluoride), crosslinked polymers of acrylate monomers having an ethylene oxide group and an ester group, epoxy monomers, and monomers having isocyanato group. The monomers can be reacted by crosslinking by heating, in combination with use of a radical initiator, ultraviolet ray (UV) or active light beam such as electron beam (EB).

The above-mentioned solvent-philic polymer can be used while being mixed with a physical property adjusting agent to an extent that the crosslink formation is not inhibited for the purpose of controlling the strength and physical properties. Examples of the physical property adjusting agent are inorganic fillers (metal oxides such as silicon oxide, titanium oxide, aluminum oxide, magnesium oxide, zirconium oxide, zinc oxide, and iron oxide; and metal carbonates such as calcium carbonate and magnesium carbonate), polymers (poly(vinylidene fluoride), vinylidene fluoride/hexafluoropropylene copolymer, polyacrylonitrile, and poly(methyl methacrylate)). The amount to be added of the above-mentioned physical property adjusting agent is generally 50% by mass or lower and preferably 20% by mass or lower based on the crosslinkable monomers.

The nonaqueous electrolyte battery of the invention is preferably produced by injecting the electrolyte before or after laminating the separator for nonaqueous electrolyte batteries, the positive electrode, and the negative electrode and finally sealing these components in an outer casing. Further, in the case of a nonaqueous electrolyte battery comprising a power generating element obtained by rolling the positive electrode and the negative electrode while sandwiching the separator for nonaqueous electrolyte batteries between them, the electrolyte is preferable to be injected before or after rolling of the power generating element. As a solution injection method, it is possible to inject the solution at normal pressure and a vacuum impregnation method and a pressurizing impregnation method are also possible to be employed.

Examples of a material for the outer casing of the lithium secondary batteries may be nickel-plated iron, stainless steel, aluminum, and metal-resin composite film. The configuration of the lithium secondary battery is not particularly limited and coin batteries and button batteries having the positive electrode, the negative electrode, and separators in a single layer or a plurality of layers can be exemplified. Further, cylindrical batteries, square type batteries, and flat type batteries comprising rolled electrode units formed by laminating the positive electrode, the negative electrode, and the separator sandwiched between them can be exemplified.

EXAMPLES

Hereinafter, the invention will be described with reference to preferable examples.

Examples 1 and 2 and Comparative Examples 1 and 2

Example 1

Production of $LiFePO_4/C$

At first, iron oxalate dehydrate ($FeC_2O_4 \cdot H_2O$), ammonium dihydrogen phosphate ($NH_4H_2PO_4$), and lithium carbonate ($Li_2CO_3$) were weighed at a molar ratio of 2:2:1. They were immersed in ethanol and pulverized and mixed for 2 hours by a ball mill to obtain a $LiFePO_4$ precursor. The reason for use of ethanol is for suppressing oxidation of the raw materials by keeping the raw materials from oxygen. Next, the $LiFePO_4$ precursor was fired at 700° C. for 12 hours in nitrogen current (2.0 l/min) to obtain a $LiFePO_4$ powder.

After the $LiFePO_4$ powder was set in a firing furnace, the temperature of the firing furnace was increased to 600° C. To the firing furnace, a gas mixture of evaporated methanol and nitrogen (containing 1% by volume of methanol) was supplied in a manner that the carbon mass to be produced by thermal decomposition of methanol became 5% by mass in $LiFePO_4$ to produce lithium iron phosphate supporting carbon ($LiFePO_4/C$) according to the present invention.

The amount of carbon in the obtained lithium iron phosphate supporting carbon ($LiFePO_4/C$) was calculated by heating the product at 700° C. and measuring the mass decrease due to combustion of carbon by thermogravimetry (TG analysis).

FIG. 1 shows an electrophotograph of the surface of one particle of the lithium iron phosphate A produced in the above-mentioned manner, taken by an electron microscope (SEM). The entire photograph of FIG. 1 shows a portion of the surface of one particle. The one particle corresponds to the secondary particles of the first invention.

As being found from FIG. 1, the secondary particles of the lithium iron phosphate A are formed by aggregating primary particles smaller than the secondary particles. In the area shown by a circle A, it can be observed that several thin and long shape carbon (fibrous carbon) are supported in the insides of the secondary particles.

The thin and long shape articles shown by B in FIG. 1 are also fibrous carbon supported in the insides of the secondary particles. A and B show clear existence of fibrous carbon, however besides them, fibrous carbon is supposed to exist in FIG. 1. Further, from FIG. 1, it can be confirmed that many fibrous carbon articles have curved shapes.

The carbon shape "fibrous" in this invention means practically thin and long shapes. No need to say, the shape and size which the "fibrous" means are not limited to the length and thickness of the fibrous carbon photographed by the electron microscope in FIG. 1.

However, the fibrous carbon in the invention preferably includes those with a thickness of 0.1 μm or thicker and 0.7 μm or thinner. Further, the fibrous carbon in the invention preferably includes those with a length of 0.5 μm or more and 5 μm or less. Carbon produced by thermal decomposition of an alcohol with a molecular weight of 100 or less often has a thickness and length within these ranges.

Figure 2:
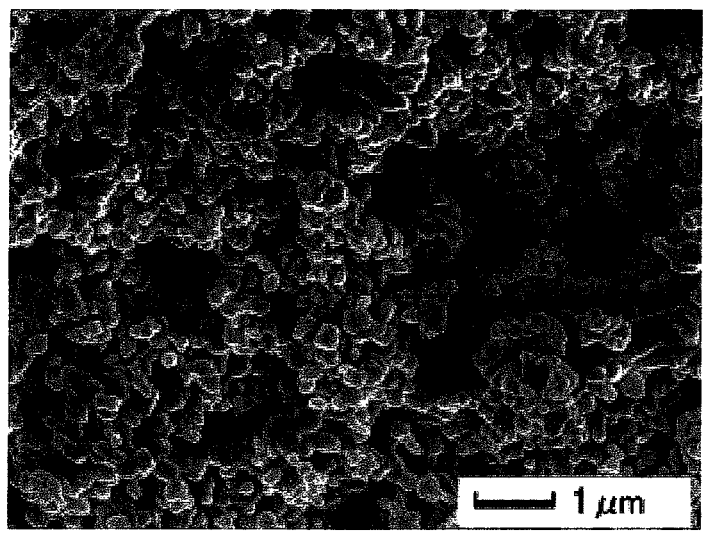
FIG. 2 is a photograph of a portion of a surface of secondary particles of lithium iron phosphate supporting no carbon, photographed by an electron microscope.

For comparison, FIG. 2 shows a photograph of a portion of the surface of secondary particles of the lithium iron phosphate supporting no carbon before the step of depositing carbon on the above-mentioned lithium iron phosphate, taken by an electron microscope (SEM). From FIG. 2, it is found that there is no fibrous article which are observed in FIG. 1 in lithium iron phosphate supporting carbon.

Production of Positive Electrode Plate

The lithium iron phosphate supporting carbon ($LiFePO_4/C$) produced in the above-mentioned method, acetylene black as a conductive agent, and poly(vinylidene fluoride) (PVdF) as a binder were mixed at a mass ratio of 80:8:12. N-Methyl-2-pyrrolidone (NMP) was added to the mixture and sufficiently mixed to produce a positive electrode paste.

After the positive electrode paste was applied to a 20 μm-thick aluminum foil current collector, the paste was dried. The application and drying were carried out for both faces of the aluminum foil. Thereafter, the press forming was carried out to produce a positive electrode plate. A positive electrode terminal was welded to the positive electrode plate by resistance welding.

Production of Negative Electrode Plate

Artificial graphite as a negative electrode material (average particle diameter 6 μm, plane distance ($d_{002}$) measured by x-ray diffractiometry 0.337 nm, crystal size in c-axial direction (Lc) 55 nm) and PVdF as a binder were mixed at a mass ratio of 94:6 and NMP was added thereto and sufficiently mixed to produce a negative electrode paste. The negative electrode paste was applied to a 15 μm-thick copper foil current collector and dried. The application and drying were carried out for both faces of the copper foil current collector. Thereafter, the press processing was carried out to produce a negative electrode plate. A negative electrode terminal was welded to the negative electrode plate by resistance welding.

Preparation of Electrolyte Solution $LiPF_6$ was dissolved in a concentration of 1 mol/l in a mixed solvent of ethylene carbonate and diethyl carbonate at a volume ratio of 1:1 to produce a nonaqueous electrolyte. The water content in the electrolyte was adjusted to be less than 30 ppm.

Production of Battery

Using the above-mentioned parts, a nonaqueous electrolyte secondary battery was produced under dry atmosphere with a dew point of −40° C. or lower as follows. A rolled body with a long cylindrical shape was produced by rolling the positive electrode plate and negative electrode plate while inserting a separator made of polypropylene (PP). A metal-resin composite film having a three layer structure of poly (ethylene terephthalate) (15 μm)/aluminum foil (50 μm)/metal-adhesive polypropylene film (50 μm) was used as an outer body.

After the above-mentioned rolled body was put in the inside of a bag-like battery case produced from the metal-resin composite film, the battery case was air-tightly sealed except a portion to be a solution injection hole. At that time, respective one ends of the positive electrode terminal and the negative electrode terminal were exposed to the outside of the battery case. After a prescribed amount of the nonaqueous electrolyte was injected through the solution injection hole, the solution injection hole part was thermally sealed in vacuum state to produce a nonaqueous electrolyte secondary battery A of Example 1 according to the present the invention.

Example 2

Production of LiFePO$_4$/C

At first, lithium hydroxide (LiOH.H$_2$O) and ammonium phosphate (NH$_4$)$_3$PO$_4$.3H$_2$O) were dissolved in ultrapure water to produce a mixed solution. Next, iron sulfate (FeSO$_4$.xH$_2$O) was dissolved in ultrapure water containing ascorbic acid to produce a mixed solution. In this case, the mixing ratio of lithium hydroxide, ammonium phosphate, iron sulfate, and ascorbic acid was adjusted to be 2.5:1:1:0.2 by molar ratio.

These two mixed solutions were mixed and hydrothermally treated at 170° C. for 12 hours and then cooled. Further, the obtained solution was filtered to collect a LiFePO$_4$ precursor which was washed with ultrapure water ad acetone and successively vacuum-dried at 100° C. for 1 hour.

Finally the LiFePO$_4$ precursor was heated at 400° C. for 1 hour in argon atmosphere to obtain a LiFePO$_4$ powder.

The LiFePO$_4$ powder was set in a firing furnace and lithium iron phosphate supporting carbon B (LiFePO$_4$/C) was produced in the same conditions as those in Example 1. The amount of carbon in LiFePO$_4$ was adjusted to be 5% by mass. Similarly to the lithium iron phosphate A, existence of fibrous carbon in the insides of the secondary particles of the lithium iron phosphate B was confirmed. A nonaqueous electrolyte secondary battery B of Example 2 was produced in the same manner as Example 1, except that the lithium iron phosphate B supporting carbon was used.

Comparative Example 1

Production of LiFePO$_4$/C

At first, a LiFePO$_4$ powder was obtained in the same manner as Example 1. The powder and polyvinyl alcohol (molecular weight 66000 to 88000) were mixed in a manner that the mass of carbon to be produced by thermal decomposition of polyvinyl alcohol became 5% by mass in LiFePO$_4$. The mixture was heated at 700° C. for 2 hours in nitrogen current (1.5 l/min) to produce lithium iron phosphate supporting carbon (LiFePO$_4$/C).

No fibrous carbon was confirmed in the insides of the secondary p articles of the lithium iron phosphate C produced in the above-mentioned manner.

A nonaqueous electrolyte secondary battery C of Comparative Example 1 was produced in the same manner as Example 1, except that the lithium iron phosphate C supporting carbon was used.

Comparative Example 2

Production of LiFePO$_4$/C

At first, iron oxalate dehydrate (FeC$_2$O$_4$.H$_2$O), ammonium dihydrogen phosphate (NH$_4$H$_2$PO$_4$), and lithium carbonate (Li$_2$CO$_3$) were weighed at a molar ratio of 2:2:1. Further, sugar was added in a manner that the mass of carbon produced by heating treatment became 5% by mass in synthesized LiFePO$_4$. The mixture was pulverized and mixed for 2 hours by a ball mill in inert atmosphere to obtain a precursor. Next, the precursor was fired at 700° C. for 12 hours in nitrogen current (2.0 l/min) to obtain a lithium iron phosphate D supporting carbon (LiFePO$_4$/C).

No fibrous carbon was confirmed in the insides of the secondary particles of the lithium iron phosphate D produced in the above-mentioned manner.

A nonaqueous electrolyte secondary battery D of Comparative Example 2 was produced in the same manner as Example 1, except that the lithium iron phosphate D supporting carbon was used.

The planned capacities of the obtained nonaqueous electrolyte secondary batteries A, B, C, and D were all 600 mAh. In this connection, the planned capacities of nonaqueous electrolyte secondary batteries E to S of Examples 3 to 17, which will be described below, were also all 600 mAh.

At first, to investigate the electron conductivity of lithium iron phosphate A to D supporting carbon, the resistivity of these powders was measured. The measurement was carried out by measuring resistance of a tablet produced by pressing 0.1 g of each powder at 10 MPa pressure. The results are shown in Table 1.

TABLE 1

|  | Lithium iron phosphate supporting carbon | Resistivity $\Omega \cdot cm$ |
|---|---|---|
| Example 1 | A | $7.4 \times 10^0$ |
| Example 2 | B | $7.3 \times 10^0$ |
| Comparative Example 1 | C | $4.3 \times 10^2$ |
| Comparative Example 2 | D | $2.5 \times 10^1$ |

From Table 1, the resistivity of the lithium iron phosphate A and B supporting carbon according to the present invention was found low as compared with that of the lithium iron phosphate C and D supporting carbon. It can be found that in Examples of the invention, carbon deposition was carried out to efficiently for forming electron conduction network as compared with the case of Comparative Examples.

When observation of the lithium iron phosphate A to D supporting carbon was carried out by SEM, as described above, fibrous carbon was observed in the insides of secondary particles in the lithium iron phosphate A and B supporting carbon of Examples 1 and 2. On the other hand, no such carbon was observed in the lithium iron phosphate C and D of Comparative Examples 1 and 2.

In the above-mentioned Examples 1 and 2, methanol was used as a raw material of carbon, it is supposed that the same result can be obtained by using an alcohol with molecular weight of 100 or less such as ethanol, propanol, butanol, and pentanol, because of the analogy of the characteristics of alcohols.

However, if the molecular weight of an alcohol is very high like polymers such as polyvinyl alcohol in the above-mentioned Comparative Example 1, the characteristics quite differ from those of methanol, and therefore, it is supposed that the result would not be similar to that in Examples 1 and 2. Accordingly, same as the case of polyvinyl alcohol, it is supposed that no fibrous carbon would be supported in the insides of the secondary particles of lithium iron phosphate even if a polymer such as polyethylene glycol and furfuryl alcohol resin (polymer obtained by polymerizing furfuryl alcohol) is thermally decomposed.

In the present invention, as described above, an alcohol as a raw material for carbon to be supported on lithium iron phosphate has a molecular weight of 100 or lower. The molecular weight is preferably 90 or lower, further preferably 80 or lower, more preferably 60 or lower, furthermore preferably 50 or lower, and even more preferably 40 or lower. Methanol is most preferable among alcohols.

Next, the high rate charge-discharge performance of nonaqueous electrolyte secondary batteries A to D was measured. The charge-discharge conditions for the measurement were as follows.

Low Rate Discharge Capacity Measurement (the Discharge Capacity in this Case is Defined as "Low Rate Discharge Capacity")

Charging: charging to 3.9 V at constant current of 0.1 C (10 hour rate, 60 mA) and further at a constant voltage of 3.9 V in total 15 hours
Discharging: discharging to 2.0 V at constant current of 0.1 C (10 hour rate, 60 mA)
High Rate Discharge Capacity Measurement (the Discharge Capacity in this Case is Defined as "High Rate Discharge Capacity")
Charging: charging to 3.9 V at constant current of 0.1 C (10 hour rate, 60 mA) and further at a constant voltage of 3.9 V in total 15 hours
Discharging: discharging to 2.0 V at constant current of 10 C (0.1 hour rate, 6 A)

The ratio of high rate discharge capacity to low rate discharge capacity is defined as "high rate/low rate capacity ratio (%)" which was used as an index expressing the high rate charge-discharge characteristic value. The results are shown in Table 2.

TABLE 2

| | Nonaqueous electrolyte secondary battery | Discharge capacity mAh | | High rate/low rate capacity ratio % |
|---|---|---|---|---|
| | | Low rate | High rate | |
| Example 1 | A | 560 | 291 | 52.0 |
| Example 2 | B | 561 | 290 | 51.7 |
| Comparative Example 1 | C | 571 | 137 | 24.0 |
| Comparative Example 2 | D | 568 | 144 | 25.4 |

From Table 2, it is found that the high rate/low rate capacity ratios (%) of the nonaqueous electrolyte secondary batteries A and B according to the present invention are higher than those of the nonaqueous electrolyte secondary batteries C and D in Comparative Examples. That is supposed to imply that in the case of the nonaqueous electrolyte secondary batteries using the lithium iron phosphate supporting fibrous carbon in the insides of the secondary particles as the positive electrode material, the electron conductive network is formed even in the inside of the secondary particles of the lithium iron phosphate by the fibrous carbon and therefore the high rate charge-discharge characteristic can be achieved.

Additionally, although the amount of carbon supported on the lithium iron phosphate was adjusted to be 5% by mass in lithium iron phosphate in Example 1, it is not limited to that in the present invention. In the invention, the ratio of mass of carbon to the mass of lithium iron phosphate in the lithium iron phosphate supporting carbon is preferably 0.01 to 30%.

If the ratio is lower than 0.01% by mass, the carbon amount is too low to increase the electron conductivity. On the other hand, if it is higher than 30% by mass, since the ratio of lithium iron phosphate is relatively decreased, the energy density of a battery using this mixed material as an active material is lowered.

Further, the amount of carbon to be supported on lithium iron phosphate is preferably 0.1% by mass to 30% by mass based on the lithium ion phosphate, more preferably 0.5% by mass to 10% by mass, and furthermore preferably 1% by mass to 5% by mass.

With respect to a nonaqueous electrolyte secondary battery produced in the same manner as Example 1, except that the amount of carbon to be supported on lithium iron phosphate was adjusted to be 1% by mass based on lithium iron phosphate, a high rate/low rate capacity ratio as similarly excellent as the nonaqueous electrolyte secondary battery A of Example 1 was obtained The ratio of the amount of carbon to lithium iron phosphate described in this specification is not the amount of carbon supported only in the inside of the secondary particles. The ratio of carbon to lithium iron phosphate is calculated from the entire amount of fibrous carbon supported on lithium iron phosphate regardless of the insides or outsides of the secondary particles.

Examples 3 to 5

A $LiFePO_4$ powder was produced in the same manner as Example 1. Lithium iron phosphate E, F, and G supporting carbon ($LiFePO_4/C$) were produced in the same manner as Example 1 by setting the powder in a firing furnace, except that the temperature of the firing furnace was changed to 385° C., 500° C., and 750° C., respectively, at the time of depositing carbon. Nonaqueous electrolyte secondary batteries E, F, and G of Examples 3 to 5 were produced in the same manner as Example 1, except that the lithium iron phosphate E, F, and G supporting carbon were used. Corresponding relation of the temperatures of the firing furnace and the reference characters E, F, and G of the corresponding nonaqueous electrolyte secondary batteries are as shown in Table 3.

Next, with respect to nonaqueous electrolyte secondary batteries E to G, the low rate discharge capacity and high rate discharge capacity were measured in the same conditions as those of the nonaqueous electrolyte secondary battery of Example 1 to calculate "high rate/low rate capacity ratio (%)". The results are shown in Table 3. For comparison, the result of Example 1 is also shown in Table 3.

TABLE 3

| | Nonaqueous electrolyte secondary battery | Temperature of firing furnace (° C.) | Discharge capacity mAh | | High rate/low rate capacity ratio (%) |
|---|---|---|---|---|---|
| | | | Low rate | High rate | |
| Example 3 | E | 385 | 558 | 272 | 48.7 |
| Example 4 | F | 500 | 565 | 294 | 52.0 |
| Example 1 | A | 600 | 560 | 291 | 52.0 |
| Example 5 | G | 750 | 552 | 285 | 51.6 |

From Table 3, it can be found that the high rate/low rate capacity ratios (%) of the nonaqueous electrolyte secondary batteries E to G are almost same as those of nonaqueous electrolyte secondary batteries A and B. It is found that in the case the thermal decomposition temperature of methanol was in a range of 385 to 750° C., the characteristics of lithium iron phosphate supporting carbon are scarcely changed.

Additionally, from the fact that the nonaqueous electrolyte secondary batteries of Examples 3 to 5 show the same high rate/low rate capacity ratio as that of the nonaqueous electrolyte secondary battery of Example 1, it is supposed that also in $LiFePO_4/C$ of Examples 3 to 5, carbon is supported on lithium iron phosphate in the same form as that of $LiFePO_4/C$ of Example 1.

Examples 6 to 9

A $LiFePO_4$ powder was produced in the same manner as Example 1. The powder was set in a firing furnace and the firing furnace was heated to 600° C. Nonaqueous electrolyte secondary batteries H and I of Examples 6 and 7 were produced in the same manner as Example 1, except that mixed gas described in Table 4 was fed in place of the mixed gas of evaporated methanol and nitrogen as a mixed gas of evaporated methanol and nitrogen.

A $LiFePO_4$ powder produced in the same manner as Example 1 was set in a firing furnace. Nonaqueous electrolyte secondary batteries J and K of Examples 8 and 9 were produced in the same manner as Example 1, except that the firing furnace was heated to 700° C., a mixed gas described in Table 4 was fed in place of the mixed gas of evaporated methanol and nitrogen as a mixed gas fed in the firing furnace.

Corresponding relation of the mixed gas types and the reference characters H, I, J, and K of the corresponding nonaqueous electrolyte secondary batteries are as shown in Table 4. The concentrations of the alcohol in the mixed gases used in Examples 6 to 9 were all 1% by volume.

Next, with respect to nonaqueous electrolyte secondary batteries H to K, the low rate discharge capacity and high rate discharge capacity were measured in the same conditions as those of the nonaqueous electrolyte secondary battery of Example 1 to calculate "high rate/low rate capacity ratio (%)". The results are shown in Table 4. For comparison, the result of Example 1 is also shown in Table 4.

TABLE 4

| Nonaqueous electrolyte secondary battery | | Type of mixed gas | Discharge capacity mAh | | High rate/low rate capacity ratio (%) |
|---|---|---|---|---|---|
| | | | Low rate | High rate | |
| Example 1 | A | Methanol + nitrogen | 560 | 291 | 52.0 |
| Example 6 | H | Methanol + argon | 551 | 284 | 51.5 |
| Example 7 | I | Methanol + helium | 569 | 293 | 51.5 |
| Example 8 | J | Ethanol + nitrogen | 560 | 290 | 51.8 |
| Example 9 | K | 1-propanol + nitrogen | 550 | 280 | 51.0 |

From Table 4, it can be found that the high rate/low rate capacity ratios (%) of the nonaqueous electrolyte secondary batteries H to K are almost same as those of nonaqueous electrolyte secondary batteries A and B. It is found that even in the case the types of alcohols and gases to be fed to the firing furnace are changed, the characteristics of lithium iron phosphate supporting carbon are scarcely changed as compared with those of Examples 1 and 2.

Additionally, from the fact that the nonaqueous electrolyte secondary batteries of Examples 6 to 9 show the same high rate/low rate capacity ratio as that of the nonaqueous electrolyte secondary battery of Example 1, it is supposed that also in $LiFePO_4$/C of Examples 6 to 9, carbon is supported on lithium iron phosphate in the same form as that of $LiFePO_4$/C of Example 1.

Examples 10 to 13

A $LiFePO_4$ powder was produced in the same manner as Example 1 and the powder was set in a firing furnace and the firing furnace was heated to 600° C. Nonaqueous electrolyte secondary batteries L, M, N, and O of Examples 10 and 13 were produced in the same manner as Example 1, except that the methanol concentration of the mixed gases of methanol and nitrogen supplied to the firing furnace and the supply time of the mixed gases were changed. Corresponding relation of the methanol concentration of the mixed gases and the reference characters L, M, N, and O of the corresponding nonaqueous electrolyte secondary batteries are as shown in Table 5.

Next, with respect to nonaqueous electrolyte secondary batteries L to O, the low rate discharge capacity and high rate discharge capacity were measured in the same conditions as those of the nonaqueous electrolyte secondary battery of Example 1 to calculate "high rate/low rate capacity ratio (%)". The results are shown in Table 5. For comparison, the result of Example 1 is also shown in Table 5.

TABLE 5

| Nonaqueous electrolyte secondary battery | | Methanol content in mixed gas | Discharge capacity mAh | | High rate/low rate capacity ratio (%) |
|---|---|---|---|---|---|
| | | | Low rate | High rate | |
| Example 10 | L | 0.01 | 552 | 294 | 53.3 |
| Example 11 | M | 0.1 | 565 | 294 | 52.0 |
| Example 1 | A | 1 | 560 | 291 | 52.0 |
| Example 12 | N | 10 | 558 | 284 | 50.9 |
| Example 13 | O | 50 | 552 | 280 | 50.7 |

From Table 5, it can be found that the high rate/low rate capacity ratios (%) of the nonaqueous electrolyte secondary batteries L to O are almost same as those of nonaqueous electrolyte secondary batteries A and B. From the result, it is found that even in the case the methanol concentration is changed in a range of 0.01% by volume to 50% by volume when the mixed gases of methanol and nitrogen are supplied to the firing furnace, the characteristics of lithium iron phosphate supporting carbon are scarcely changed.

Additionally, from the fact that the nonaqueous electrolyte secondary batteries of Examples 10 to 13 show the same high rate/low rate capacity ratio as that of the nonaqueous electrolyte secondary battery of Example 1, it is supposed that also in $LiFePO_4$/C of Examples 10 to 13, carbon is supported on lithium iron phosphate in the same form as that of $LiFePO_4$/C of Example 1.

Example 4

Production of $LiFePO_4$/C

At first, iron oxalate dehydrate ($FeC_2O_4.2H_2O$), ammonium dihydrogen phosphate ($NH_4H_2PO_4$), and lithium carbonate ($Li_2CO_3$) were weighed at a molar ratio of 2:2:1. They were pulverized and mixed using ethanol as a solvent for 2 hours by a ball mill in inert atmosphere to obtain a precursor.

Next, the precursor was fired in conditions of at 700° C. for 12 hours in nitrogen current (2.0 l/min) using a rotary kiln. Thereafter, while the temperature of the kiln was decreased, a mixed gas of evaporated methanol and nitrogen was fed in a manner that the carbon mass to be produced by thermal decomposition of methanol became 5% by mass in $LiFePO_4$. In such a manner, lithium iron phosphate P supporting carbon ($LiFePO_4$/C) according to the present invention was produced. The temperature decreasing rate of the kiln was 1° C./min.

A nonaqueous electrolyte secondary battery P of Example 14 according to the present invention was produced in the same manner as Example 1, except that the lithium iron phosphate P supporting carbon (LiFePO$_4$/C) was used for the lithium iron phosphate material supporting carbon Example 15

Lithium iron phosphate Q supporting carbon (LiFePO$_4$/C) according to the invention was produced in the same manner as Example 14, except the temperature of the rotary kiln was not decreased but kept constantly at 700° C. and the mixed gas of methanol and nitrogen was supplied to the rotary kiln.

A nonaqueous electrolyte secondary battery Q of Example 15 according to the present invention was produced in the same manner as Example 1, except that the lithium iron phosphate Q supporting carbon (LiFePO$_4$/C) was used for the lithium iron phosphate material supporting carbon.

At first, to investigate the electron conductivity of lithium iron phosphate P and Q supporting carbon, the resistivity of these powders was measured. The measurement was carried out by measuring resistance of a tablet produced by weighing 0.1 g of lithium iron phosphate supporting carbon and pressing each powder at 10 MPa pressure. The results are shown in Table 6.

TABLE 6

|  | Resistivity |
| --- | --- |
| Lithium iron phosphate P | 7.0 Ω · cm |
| Lithium iron phosphate Q | 7.4 Ω · cm |

From Table, it is found that the resistivity values of the lithium iron phosphate P and lithium iron phosphate Q are almost same. It means that since the electron conductivity of carbon supported on the surface of lithium iron phosphate is same, the electron conductivity values of these powders are also approximately same.

Next, using the nonaqueous electrolyte secondary batteries P and Q, measurement of the low rate discharge capacity and high rate discharge capacity was carried out in the same conditions as those of the nonaqueous electrolyte secondary battery of Example 1. The results are shown in Table 7.

TABLE 7

|  | Low rate discharge capacity | High rate discharge capacity |
| --- | --- | --- |
| Lithium iron phosphate P | 560 mAh | 315 mAh |
| Lithium iron phosphate Q | 561 mAh | 288 mAh |

From Table 7, it is found that the low rate discharge capacity is same for the nonaqueous electrolyte secondary batteries P and Q. However, it was revealed that the high rate discharge capacity of the nonaqueous electrolyte secondary battery P is remarkably high as compared with that of the nonaqueous electrolyte secondary battery Q.

It is supposed that this difference is caused according to the following mechanism. When the temperature of the inside of the rotary kiln was decreased, the gas in the container is shrunk. Naturally, the gas in insides of the secondary particles of lithium iron phosphate is also shrunk. Accordingly, gas current toward the insides of the secondary particles is generated in the insides and the periphery of the secondary particles. As a result, gas to be a raw material of carbon enters much to deep parts of the secondary particles. Consequently, much carbon can be supported in the deep parts of the secondary particles.

As a result, it is supposed that sufficient electron conductive network is formed even in deep parts of the insides of the secondary particles. Accordingly, it is supposed that even if the battery is discharged at a high rate, since the deep parts in the insides of the secondary particles of lithium iron phosphate can involve the discharge reaction, excellent high rate charge-discharge performance can be obtained.

INDUSTRIAL APPLICABILITY

As described above, use of a mixed material of lithium iron phosphate and carbon of the invention makes it possible to produce a battery excellent in high rate charge-discharge performance. Accordingly, the mixed material of lithium iron phosphate and carbon of the invention is remarkably valuable in industrial fields.

The invention claimed is:

1. A mixed material comprising
an aggregate of lithium iron phosphate particles; and
fibrous carbon present inside the aggregate,
wherein said fibrous carbon has a length ranging from 0.5 μm to 5 μm.

2. The mixed material according to claim 1, wherein the fibrous carbon includes carbon with a curved shape.

3. An electrode, comprising the mixed material according to claim 1 as an active material.

4. A battery comprising an electrode according to claim 3.

5. A method for producing a mixed material comprised of an aggregate of lithium iron phosphate particles and fibrous carbon present inside the aggregate, wherein said fibrous carbon has a length ranging from 0.5 μm to 5 μm,
said method comprising
providing lithium iron phosphate or a raw material of lithium iron phosphate in a container;
subjecting an alcohol with a molecular weight of 100 or less to thermal decomposition in the container containing the lithium iron phosphate particles to form the mixed material comprised of the aggregate of the lithium iron phosphate particles and the fibrous carbon,
wherein the fibrous carbon is formed from the thermal decomposition of the alcohol and does not include a carbon produced from a polymer of the alcohol, said polymer being a product of polymerization of the alcohol and having a molecular weight exceeding 100.

6. The production method according to claim 5, which comprises a step of feeding the alcohol into the container containing the raw material of lithium iron phosphate or lithium iron phosphate, wherein the inside of the container is kept in a temperature range of thermal decomposition of the alcohol.

7. The production method according to claim 5, comprising a step of feeding the alcohol to the container while the temperature of the inside of the container is decreased to a temperature range of the thermal decomposition of the alcohol.

8. A method for producing a battery, wherein the lithium iron phosphate particles produced by the production method according to claim 5 are used as an active material.

9. The mixed material according to claim 1, wherein said fibrous carbon has a thickness ranging from 0.1 μm to 0.7 μm.

10. The production method according to claim 5, wherein the alcohol is methanol, ethanol, propanol, or butanol.

* * * * *